July 21, 1970

A. F. BULFER 3,521,075

METER READING SYSTEM COMPRISING FILMING OF METER
DIAL AND SUBSEQUENT ANALYSIS OF THE
FILM USING CORRELATION TECHNIQUES
Filed June 11, 1968

INVENTOR
ANDREW F. BULFER

BY

*J. O. Tresansky*
ATTORNEY

United States Patent Office 3,521,075
Patented July 21, 1970

3,521,075
METER READING SYSTEM COMPRISING FILM-
ING OF METER DIAL AND SUBSEQUENT
ANALYSIS OF THE FILM USING CORRELA-
TION TECHNIQUES
Andrew F. Bulfer, Columbus, Ohio, assignor, by mesne
assignments, to the United States of America as represented by the Secretary of the Navy
Filed June 11, 1968, Ser. No. 736,212
Int. Cl. G06k 9/00
U.S. Cl. 250—219        5 Claims

ABSTRACT OF THE DISCLOSURE

The subject invention provides a method of and apparatus for rapid analysis of data recorded on ordinary movie camera film. The device is described as an optical correlation receiver for automatic data reduction and obviates manual reduction of such film-recorded data. According to the invention, data from indicator dials such as those composing an instrument bank is continuously registered on movie film. The developed data-bearing film is then projected on a screen having a plurality of windows, each window corresponding in size and location to an image of an indicator dial being projected on the screen. Behind each window is a driven loop of movie film, each frame thereof bearing an image of a single possible reading of the projected dial image. All such film loops may be driven continuously and asynchronously by a single motor. As each frame of the movie film is projected on the screen, each film loop is driven until correlation of a single film loop image with the corresponding dial image occurs as seen by a photocell positioned to accept the light passing through the film loop and is measured by the maximum light intensity passed through the film loop.

On such analysis, the readings of all the dial images will be registered and may be serially recorded on magnetic tape for further analysis.

BACKGROUND OF THE INVENTION

Field of the invention

The present invention relates to an automatic data reduction system utilizing optical means which compares a received image with a group of pre-recorded images. The image that correlates most with the received image is judged to be the correct one.

Description of the prior art

Blackstone in U.S. Pat. No. 2,963,542 discloses a scanner-recorder comprising scanning means, optical recorders, motor-driven film strips, and projection of an image of recorded data on an optical system for transport and storage. The device of Blackstone superficially resembles the present invention in its use of motor-driven film strips and optical devices. However, the Blackstone device serves as a recorder of data and not as data reduction means. Additionally, other structure and the method of operation of the Blackstone device differs substantially from the present invention.

Although certain other devices of the prior art disclose data recording means which bear some resemblance to the present invention, such as projection of an image onto a screen and subsequent reading from the screen by an optical system, the prior art devices do not function in the manner of the present device.

SUMMARY

Photorecorders now in use for data collection generally consist of a bank of dials plus lights and other information rendering devices in front of which is mounted an ordinary movie camera. Data is recorded by photographing the instrument bank on ordinary movie film. The film must then be developed and read manually frame by frame with the results punched on cards and fed into computers for analysis. Such film is normally read at an error-prone rate of 900 painstaking frames per day. The subject invention provides an automatic data reduction device capable of reading 28,000 frames of photorecorder film per day.

According to the present invention, the image on each frame is enlarged by projecting the developed film on a screen, thus easing mechanical tolerance. The screen contains a series of windows, each corresponding in relative size and location to a dial on the original instrument bank. Behind each window runs a film loop bearing an exact and complete copy of the figures and hash marks of the particular dial, the film loop being driven by a motor and a sprocket arrangement running continuously and asynchronously. Behind each window and film loop combination is a single photocell which measures the intensity of the light passed through the film strip. At the instant that the output of the photocell reaches a maximum, corresponding to maximum "correlation" of the film loop image with the projected image, the output of a digital shaft encoder also mounted on the motor shaft is sampled and fed into a waiting flip-flop register. Thus, the register's contents indicate the reading of the particular dial. When all registers have been filled, their contents are simply converted from parallel to serial form and recorded on compatible magnetic tape for further analysis.

It is therefore an object of the invention to provide automatic means for data reduction from photorecorder film.

It is another object of the invention to provide an optical correlation receiver for rapid analysis of film-recorded data which would require no change or modification of existing photorecording equipment.

It is a further object of the invention to provide rapid and efficient data reduction means to replace manual data reduction methods.

Further objects and attendant advantages will become more readily apparent by reference to the following description of the preferred embodiment of the invention.

DESCRIPTION OF THE PREFERRED EMBODIMENT

Figure 1:
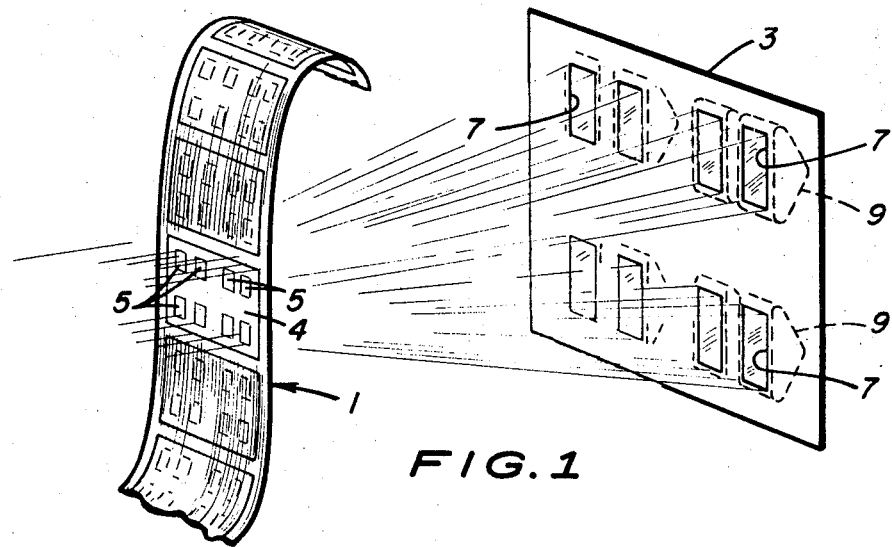
FIG. 1 depicts a frame of photorecorder film being projected onto the receiving screen of the present invention, individual film loops containing images of meter dials, lights or the like being shown in broken lines.

In communication theory, a "correlation receiver" operates according to the following description. A "transmitter" transmits one message from a list of permissible messages. A "receiver" receives a signal which consists of this message garbled by noise, static, etc. The problem is deciding which of the messages on the list was transmitted. The solution employed by the "correlation receiver" is to compare the received signal with the messages on the list one at a time. The message that most nearly "correlates" with the received signal is judged to be the message with the "maximum likelihood" of having been sent. This principle is herein broadly applied to photorecorder film reading.

Referring to the drawings, a typical frame 1 of photorecorder film is projected by well-known means, such as a movie projector 2, onto a screen 3. The frame 1 has been exposed by a device such as an MK14 photorecorder used to gather data on fire control system performance aboard ships. Such a photorecorder continuously photographs the readings of a set of dial indicators on an instrument bank. The frame 1 contains an instantaneous reproduction of the reading of the dial indicators on said instrument bank, a dial indicator image being seen on the frame 1 at 5. For convenience, eight dial indicator images are shown as having been recorded on the frame 1, although the number of dial indicators on an instrument bank generally exceeds thirty.

The screen 3 has a plurality of windows 7, each window corresponding in relative size and location to the indicator dial image 5 being projected on said screen.

Figure 2:
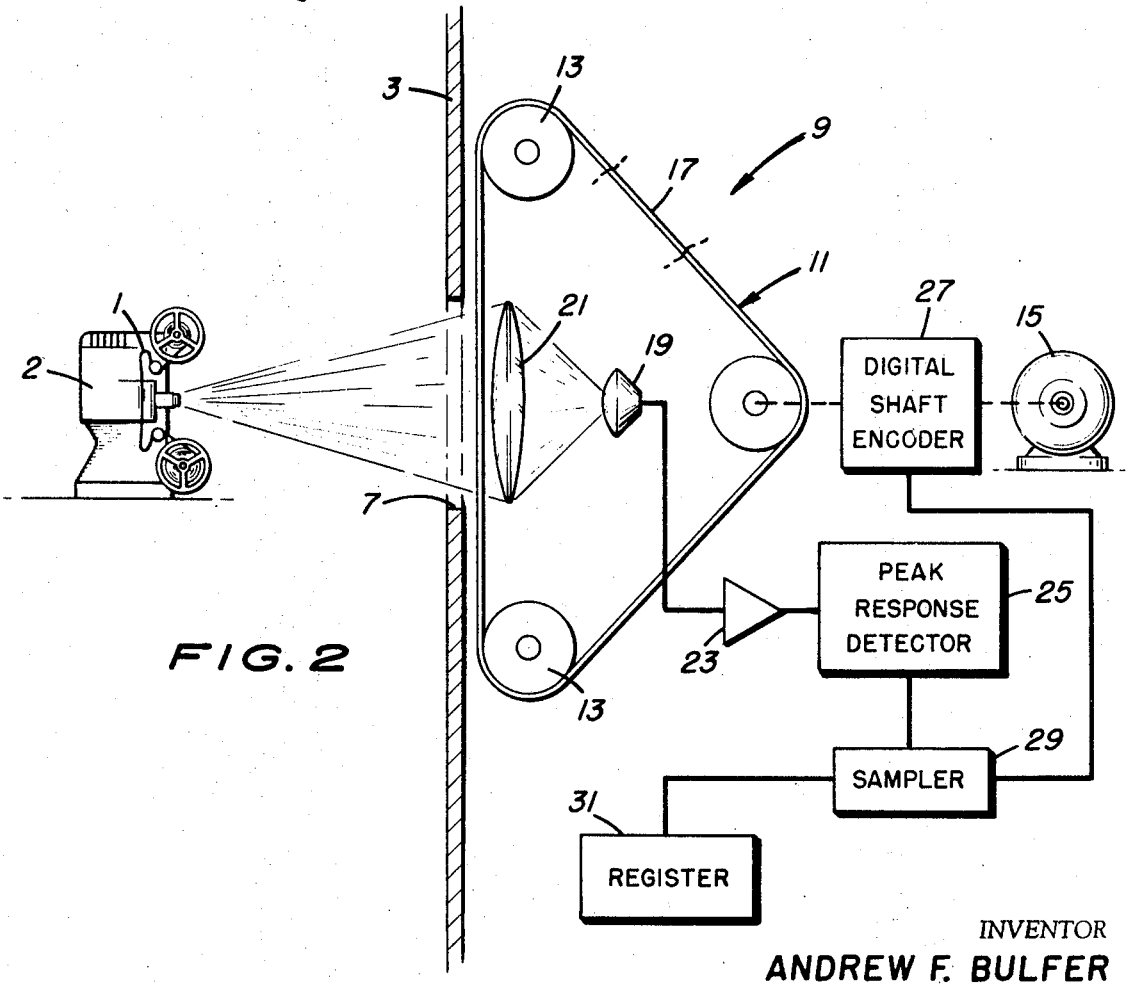
FIG. 2 is a schematic showing the projection of one dial image to a corresponding window in the screen, the figure also showing one of the film loops and the equipment associated therewith.

Behind each window 7 is a light response indicator unit shown generally at 9 in phantom in FIG. 1 and seen more clearly in FIG. 2, which is a schematic of one of the units 9 with associated components to be hereinafter described. With particular reference to FIG. 2, a loop 11 of movie film is held behind the window 7 on rollers 13 which are driven by a motor 15. The motor 15 can be arranged to drive continuously and asynchronously all of the film loops 11.

The film loop 11 consists of a number of frames 17, each frame thereof bearing an image of a single reading of a dial image. Thus for each projected image 5 of a dial from one of the frames 1, there is provided behind one of the windows 7 a frame 17 on the film loop 11 which bears an image corresponding to the image on frame 1.

As each frame 1 of the film is projected on the screen 3, each film loop 11 is continuously driven until and after correlation with one of the frames 17 on the loop 11 is achieved, as seen by a photocell 19 from light from the projector 2 directed to said photocell by a lens 21. At the instant the output of the photocell 19 reaches a maximum, corresponding to maximum "correlation" of the film loop image with the projected image, such maximum output is detected by the peak response detector 25 which instantly sends a command to sampler 29 ordering it to measure the relative position of the film loop as indicated by the digital shaft encoder 27 and to store this information in register 31. The encoder 27, sampler 29, peak response detector 25, amplifier 23 and register 31 are of conventional design and need not be described in detail. Thus the contents of the register 31 will indicate the reading of a particular dial. When all of the registers 31 have been filled, their contents are simply converted from parallel to serial form and recorded on compatible magnetic tape for further analysis by computers.

Nothing in the system requires tight tolerances. Almost all of the electronics comprises either pulse or digital circuitry. The photocell and its associated amplifier need not be particularly linear and probably need not handle frequencies higher than 50 kc.

Although the invention requires a lens, photocell, amplifier, peak detector, and flip-flop register for each indicator being read, there need only be one motor and one digital shaft encoder serving them all. Additionally, the component count could be reduced by any factor at the expense of running the film through the machine a number of times equal to that factor.

The speed of the device can easily be engineered to at least 1 frame per second. Careful design might increase the speed considerably, perhaps to a point enabling use of a standard movie projector to project the images on the screen 3.

The signal-to-noise ratio problem at the photocell is obviated by the fact that two to six two-digit numbers are in view on any dial at all times. Thus, the S/N ratio is greater by that factor than it would otherwise be.

It is believed apparent from the foregoing description that the invention may be practiced other than is specifically described. Accordingly, minor changes in construction and operation should be permissible within the scope of the appended claims.

What is claimed is:
1. In an automatic data reduction system, a method for reducing data stored on recording film, comprising the steps of:
 exposing the recording film so as to photograph the readings of a number of indicator dials on an instrument bank,
 correlating images of the indicator dials on the recording film with images of readings recorded on a comparing means, and
 recording maximum correlations in the form of stored information for further analysis.

2. In a data reduction system utilizing optical correlation means, a method for rapid, automatic analysis of photorecorder film, comprising the steps of:
 exposing successive frames of photorecorder film in such a manner as to cause reproduction on each frame of an image of successively instantaneous readings of a number of dial indicators on an instrument bank,
 projecting each frame of the exposed photorecorder film onto a screen having windows corresponding in relative size and location to the dial indicators of the photographed instrument bank,
 focusing the projected images from each frame of film through the corresponding windows and onto continuously driven film loops situated behind each window, the film loops comprising frames, each frame thereof bearing an image of a single reading of one of the dial indicators,
 correlating the image of a frame being projected on the screen with a frame on the driven film loop corresponding to a particular reading, such correlation being effected by measuring the maximum light intensity passed through the film loop frame, and
 recording and storing information concerning the maximum correlation corresponding to maximum light intensity transmission through the film loop frame, said stored information being utilized for further analysis.

3. An apparatus for automatically reducing data stored on photorecorder film to a more useable form, comprising:
 correlating means for matching the images of indicator dials recorded on a frame of the photorecorder film with a set of readings on the dial indicators,
 detecting and sampling means for denoting and describing the maximum correlation of the recorded images, and
 registering means for storing the indicated readings of each dial indicator.

4. The apparatus of claim 3 wherein said correlating means comprises:
 means containing windows corresponding in relative size and location to the dial indicators, said means serving as a screen onto which is successively projected frames of photorecorder film,
 a film loop and associated loop driving means situated behind each window, each said film loop being composed of frames bearing a set of indications of a corresponding dial indicator,
 light intensity metering means located proximous to each film loop, and
 focusing means to direct light transmitted through the film loop to the light intensity metering means.

5. The apparatus of claim 4 wherein the detecting and sampling means comprise:
 peak response detecting means associated with each light intensity metering means for determining the maximum light transmission to the metering means, said maximum transmission corresponding to the maximum correlation of the projected images from the photorecorder film with the images of readings on the frame of each film loop, and encoding means serving all of the peak response detecting means for holding information received from the detecting means.

References Cited

UNITED STATES PATENTS

| 2,963,542 | 12/1960 | Blackstone | 178—6.7 |
| 3,215,848 | 11/1965 | Zworykin | 250—230 |
| 3,238,375 | 3/1966 | Johnson | 250—219 |
| 3,249,028 | 5/1966 | Hibbonnet et al. | 340—324 |

ARCHIE R. BORCHELT, Primary Examiner

M. ABRAMSON, Assistant Examiner

U.S. Cl. X.R.

250—237; 178—6.7; 179—100.3; 235—181; 340—149